No. 634,426. Patented Oct. 3, 1899.
D. CAMERON, F. J. COMMIN & A. J. MARTIN.
APPARATUS FOR TREATING SEWAGE.
(Application filed Nov. 26, 1898.)
(No Model.) 2 Sheets—Sheet 1.

THE NORRIS PETERS CO., PHOTO-LITHO., WASHINGTON, D. C.

No. 634,426. Patented Oct. 3, 1899.
D. CAMERON, F. J. COMMIN & A. J. MARTIN.
APPARATUS FOR TREATING SEWAGE.
(Application filed Nov. 26, 1898.)

(No Model.) 2 Sheets—Sheet 2.

UNITED STATES PATENT OFFICE.

DONALD CAMERON, FREDERICK J. COMMIN, AND ARTHUR J. MARTIN, OF EXETER, ENGLAND.

APPARATUS FOR TREATING SEWAGE.

SPECIFICATION forming part of Letters Patent No. 634,426, dated October 3, 1899.

Original application filed May 2, 1898, Serial No. 679,522. Divided and this application filed November 26, 1898. Serial No. 697,498. (No model.)

*To all whom it may concern:*

Be it known that we, DONALD CAMERON, FREDERICK JAMES COMMIN, and ARTHUR JOHN MARTIN, subjects of the Queen of Great Britain, residing at Exeter, in the county of Devon, England, have invented new and useful Improvements in Apparatus for the Treatment of Sewage and other Liquids, (for which we have made application for Letters Patent in Great Britain, No. 27,349, dated November 22, 1897; in France, No. 264,570, dated May 18, 1898; in Belgium, No. 135,680, dated May 18, 1898, and in Germany, dated May 20, 1898, and September 19, 1898,) of which the following is a specification.

This case is a division of our application, Serial No. 679,522, filed May 2, 1898.

This invention relates to apparatus for automatically effecting the discharge of liquid from chambers or receptacles and the delivery of liquid to other chambers or receptacles which it is desired to fill. It has particular reference to filters for treating sewage or sewage effluent, in connection with which it will be hereinafter described.

We will now proceed to describe our invention in connection with the accompanying drawings, in which—

Figure 1:
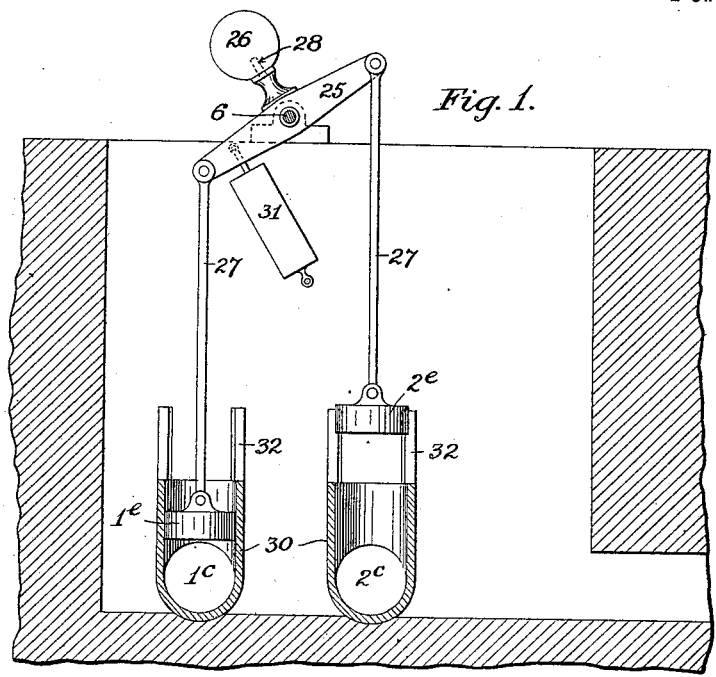
Figure 2:
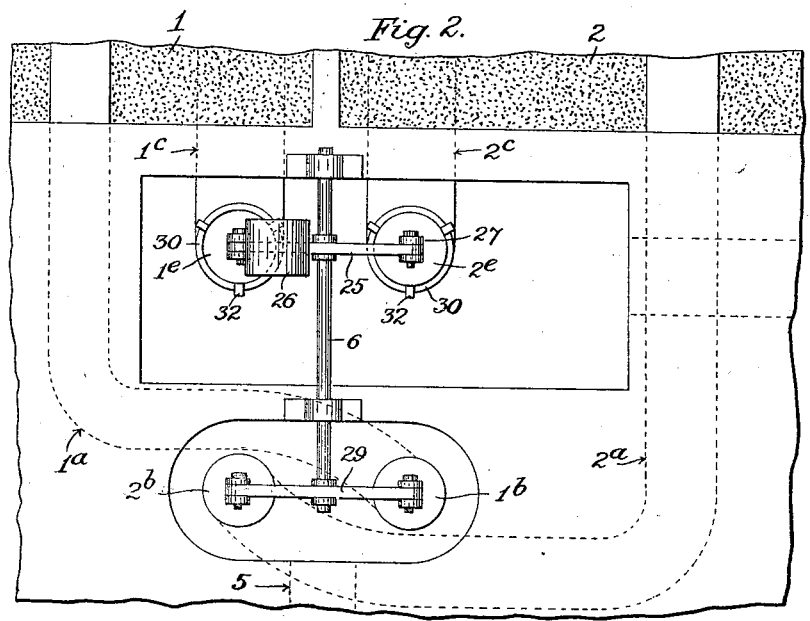
Figure 3:
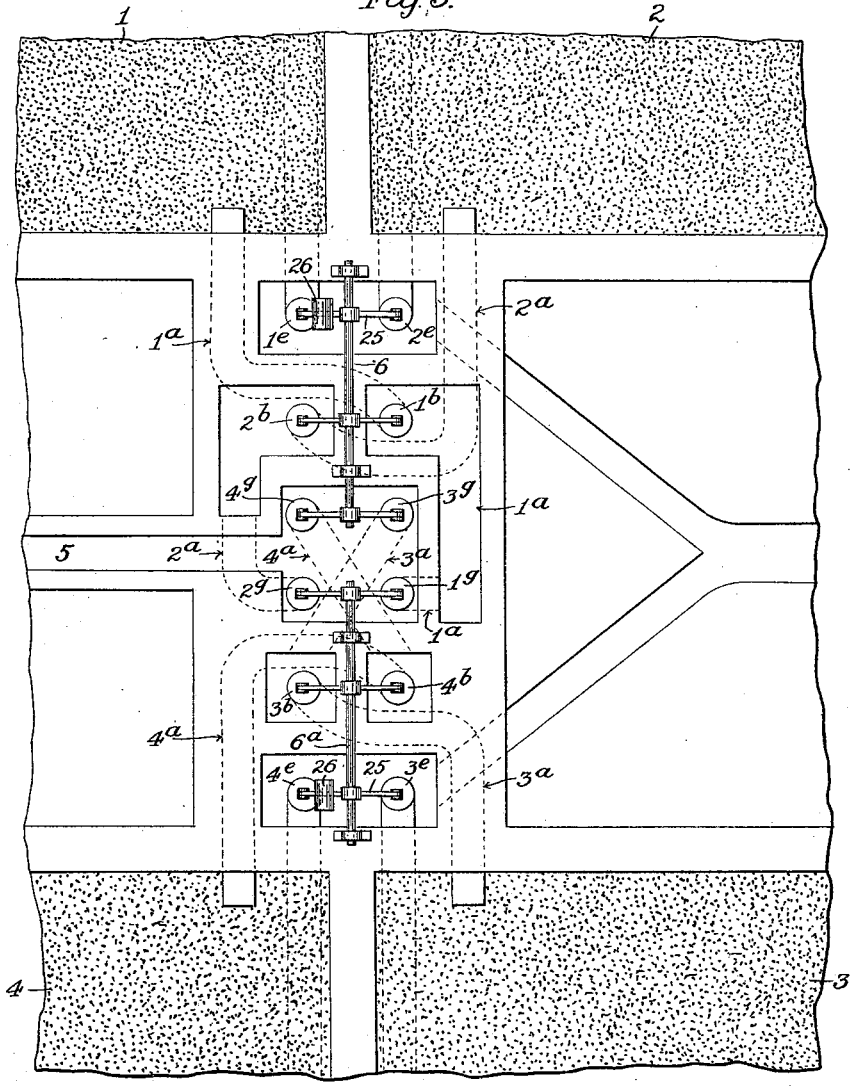

Figure 1 is a longitudinal section showing an arrangement in which the pressure of the liquid when it reaches a certain desired height is employed to actuate the valves of the filters in connection with which the apparatus is used, and Fig. 2 is a plan view of same. Fig. 3 is a plan view showing the above arrangement applied to a set of four filters.

According to the part of our invention illustrated in Figs. 1 and 2 the necessary movement for operating the valves is obtained by arranging the discharge-valve from each chamber to open outward, the opening being effected by the pressure of the liquid in the chamber when same has risen to a certain desired height. The height to which the liquid will rise before it will open the valve may, as shown, be regulated by a weight 26, applied to the valve either directly or otherwise.

It will be convenient to arrange the chambers in pairs, with the outlets from each pair adjacent to one another, and to connect the two discharge-valves $1^e$ and $2^e$ by links 27 and a lever 25 or otherwise, so that the opening of one valve shall close the other. The weight 26, which keeps the valves closed, may be conveniently attached to an arm 28 on the lever 25 and projecting upward at right angles to it.

It will be understood that the valves $1^b$ and $2^b$, controlling the supply to two filters or chambers whose discharge-valves $1^e$ and $2^e$ are connected as described, may be operated by a lever 29, mounted on the same shaft 6 as that which carries the lever 25, connecting the discharge-valves, or they may be mounted on lever 25, or, if desired, the shaft carrying the lever operating the supply-valves may be connected with the lever actuated by the discharge-valves by means of connecting-rods or otherwise. The flow of liquid to the filters or chambers may, however, be controlled in any suitable manner, the essential point of this part of our invention being that the discharge-valve of a filter is opened by the pressure of liquid in the latter when such liquid reaches a certain desired level, thus discharging such filter, and at the same time by any suitable means opening the supply to another filter or chamber which is empty.

In order to secure the complete opening of the valves, these may be formed as pistons within cylinders 30, such cylinders extending so far in the direction in which the valves travel that the latter will not leave them until they have moved so far that the weight 26 will aid instead of opposing their motion. The opening and closing of the valves may be regulated, if necessary, by dash-pots 31 or other suitable devices, and guides 32 are preferably provided for keeping such valves in their proper positions relative to their cylinders after they have left the latter. Dash-pots may also be used in connection with other forms of our apparatus in which it is desired to secure a gradual opening or closing of the valves.

Where more than two chambers are used, it will be convenient to be able to discharge one chamber of a pair without at once filling the other, as would happen if the flow to the latter were controlled only by the supply-valve which is opened on the discharge of the former. To this end we may, as shown in Fig. 3, place additional valves $1^s$ $2^s$ $3^s$ $4^s$ on the supply-pipes $1^a$ $2^a$ $3^a$ $4^a$ to the filters or chambers 1 2 3 4, each of such additional valves being actuated by the discharge of one of the filters or chambers belonging to some other pair. Any chamber will then receive liquid only when both supply-valves (which we will hereinafter refer to as "primary" and "secondary" valves, respectively) are open and not when either or both of them are closed.

In Fig. 3 it will be seen that a set of four filters is shown, the lever actuated by the discharge-valves for filters 1 and 2 being mounted on the same shaft 6 as the levers carrying the secondary supply-valves for these filters and the primary supply-valves for filters 3 and 4, while the lever actuated by the discharge-valves of filters 3 and 4 is mounted on the same shaft $6^a$ as the levers carrying the secondary supply-valves for these filters and the primary supply-valves for filters 1 and 2. In order to describe the operation of this arrangement, we will take, for example, the case where filter 1 is the next to be filled, the different supply-valves being then arranged as follows: Secondary valves $1^b$ and $4^b$ will be opened, so that the valves $2^b$ and $3^b$ will be closed, while of the primary valves $1^s$ and $3^s$ are opened and $2^s$ and $4^s$ closed. In this position of the parts the discharge-valves $2^e$ and $3^e$ are open and $1^e$ and $4^e$ closed. It will therefore be seen that in this position filter 1 will be filling from the main supply 5 through primary valve $1^s$, passage $1^a$, secondary valve $1^b$, and so through the continuation of passage $1^a$ to filter 1, while if there is any liquid in filter 3 it will be discharged through valve $3^e$. On filter 1 becoming filled to the desired height the pressure of the liquid in same will raise discharge-valve $1^e$, thereby reversing the position of all the valves carried by the shaft 6, to which it is connected, so that the secondary supply-valve $1^b$ of filter 1 will be closed and the secondary supply-valve $2^b$ of filter 2 opened. At the same time the discharge-valve $1^e$ of filter 1 will be opened and discharge-valve $2^e$ of filter 2 closed; also, the primary supply-valve $3^s$ of filter 3 will be closed and the primary supply-valve $4^s$ of filter 4 opened. The valves connected to the shaft $6^a$, actuated by the discharge-valves of the filters 3 and 4, will not be operated by this movement, so that a passage will have been opened through primary valve $4^s$, passage $4^a$, and secondary valve $4^b$ to filter 4, which will thus be filled in its turn, filter 1 in the meantime being discharged. On filter 4 becoming full its discharge-valve $4^e$ will be operated, altering the positions of the valves connected to the shaft $6^a$, so that the effluent will now be able to pass to filter 2 through primary supply-valve $2^s$, passage $2^a$, and the secondary supply-valve $2^b$, filter 4 being discharged during the filling of filter 2. On filter 2 discharging the shaft 6 will be operated by the discharge-valve $2^e$ of this filter, and the valves connected to it being thus altered in position filter 3 will be filled through primary supply-valve $3^s$, passage $3^a$, and secondary supply-valve $3^b$.

As above described, each filter is discharged immediately it becomes full; but if it should be found advisable to allow the effluent to remain in the filter for a short time this can be effected by checking the movement of the opening of the discharge-valve by means of a dash-pot or other suitable device attached to one of the levers, as shown and described in connection with the arrangement illustrated in Figs. 1 and 2.

What we claim as our invention, and desire to secure by Letters Patent, is—

1. The combination of a receptacle for containing liquid provided with a discharge-orifice, a valve for closing said orifice adapted to be opened by the pressure of the liquid in said receptacle when said liquid rises to the desired height, and means for holding said valve in open position until all the liquid therein has been discharged.

2. The combination of a receptacle having a discharge-orifice, a valve for closing said orifice adapted to be opened by the pressure of the liquid when it rises to a determined height, and means operated by the supply mechanism of another receptacle for closing said discharge-valve preparatory to the filling of the receptacle.

3. The combination of a receptacle adapted to be emptied after it is filled to a certain height, a valve adapted to be opened by the pressure of the liquid in the receptacle, said valve having a weight adapted to resist the pressure until the liquid rises to the desired height, and means for filling said receptacle, said means being operated by the motion imparted by said discharge-valve.

4. The combination of a receptacle adapted to be emptied after it has been filled to a certain height, a valve arranged to be opened by the pressure of the liquid in the receptacle, said valve being provided with weights adapted to resist the pressure until the liquid rises to the desired height, and a dash-pot for regulating the opening of said valve.

5. The combination of a receptacle having a discharge-orifice, a cylinder disposed in said receptacle, a lever, a piston-valve connected to said lever and working within said cylinder, said valve being opened by the pressure of the liquid in the receptacle, a weight disposed on said lever for regulating the opening of the valve, and enabling the valve to remain in the cylinder until said weight aids in its opening movement.

6. The combination of a plurality of receptacles adapted to be alternately filled to a certain height and then emptied, one or more valves for each receptacle arranged to open outward by the pressure of the liquid in said receptacle, and a lever whereby the opening of one valve is made to close that of the other.

7. The combination of a set of receptacles adapted to be filled and discharged, two supply-valves for each receptacle, both of which must be opened before the supply can take place, said valves being controlled by the overflow from a separate receptacle.

8. The combination of a plurality of receptacles adapted to be successively filled and discharged, and an additional valve disposed on the supply-pipe of each receptacle, the opening and closing of said valve being controlled by the filling of other receptacles.

DONALD CAMERON.
FRED. J. COMMIN.
ARTHUR J. MARTIN.

Witnesses:
ALBERT ZELLEY,
H. E. BARTLETT.